(12) United States Patent
Bourely et al.

(10) Patent No.: US 12,298,120 B2
(45) Date of Patent: May 13, 2025

(54) DEVICE FOR INSPECTING OBJECTS IN A MOVING FLOW AND MACHINE COMPRISING SUCH A DEVICE

(71) Applicant: PELLENC SELECTIVE TECHNOLOGIES, Pertuis (FR)

(72) Inventors: Antoine Bourely, La Tour d'Aigues (FR); Nicolas Grotus, Aix-en-Provence (FR)

(73) Assignee: PELLENC SELECTIVE TECHNOLOGIES, Pertuis (FR)

( * ) Notice: Subject to any disclaimer, the term of this patent is extended or adjusted under 35 U.S.C. 154(b) by 185 days.

(21) Appl. No.: 18/014,743

(22) PCT Filed: Jul. 9, 2021

(86) PCT No.: PCT/EP2021/069121
§ 371 (c)(1),
(2) Date: Jan. 6, 2023

(87) PCT Pub. No.: WO2022/008709
PCT Pub. Date: Jan. 13, 2022

(65) Prior Publication Data
US 2023/0273014 A1   Aug. 31, 2023

(30) Foreign Application Priority Data

Jul. 10, 2020   (FR) ..................... 2007346

(51) Int. Cl.
*G01B 11/06*   (2006.01)
*B07C 5/342*   (2006.01)
(52) U.S. Cl.
CPC .......... *G01B 11/0691* (2013.01); *B07C 5/342* (2013.01); *G01B 11/0608* (2013.01)

(58) Field of Classification Search
CPC .. G01B 11/0691; G01B 11/0608; B07C 5/342
See application file for complete search history.

(56) References Cited

U.S. PATENT DOCUMENTS

| 5,101,442 | A  | 3/1992 | Amir |
| 2004/0095571 | A1 | 5/2004 | Bourely et al. |

(Continued)

FOREIGN PATENT DOCUMENTS

WO    2020048916    3/2020

OTHER PUBLICATIONS

International Search Report dated Sep. 7, 2021.

*Primary Examiner* — Jamil Ahmed
(74) *Attorney, Agent, or Firm* — IPSILON USA, LLP

(57) ABSTRACT

The present invention relates to a device (1) for inspecting objects (2) moving in a flow (F) on a surface (3) moving in a direction (D), this device (1) comprising a lighting means (4) providing an illuminated strip (6) at the surface (3), a detection means (7) having an optical axis (AO) and, finally, a means (8) for processing and evaluating the signals supplied by the detection means (7) in order to detect the presence of the moving objects (2), map their height and/or determine their volume. This device (1) is characterised in that the median plane (PM) of the light beam (5) and the optical axis (AO) of the detection means (7) have an angle (AP) between them, in that the image of the illuminated strip (6) acquired by the detection means (7) has a width equal to at least three times the resolution of the means (7), and in that the lighting means (4) is configured in such a way that the illuminated strip (6) generated at the support surface (3) is delimited by two opposing straight parallel edges and has a sufficient contrast with respect to the non-illuminated zones (6'), regardless of the colour of the object (2).

20 Claims, 10 Drawing Sheets

(56) References Cited

U.S. PATENT DOCUMENTS

| | | | |
|---|---|---|---|
| 2013/0229510 A1* | 9/2013 | Killmann | G06T 7/0004 348/91 |
| 2019/0047024 A1 | 2/2019 | Bourely et al. | |

* cited by examiner

DEVICE FOR INSPECTING OBJECTS IN A MOVING FLOW AND MACHINE COMPRISING SUCH A DEVICE

RELATED APPLICATION

This application is a National Phase of PCT/EP2021/069121 filed on Jul. 9, 2021, which claims the benefit of priority from French Patent Application No. 20 07346, filed on Jul. 10, 2020, the entirety of which are incorporated by reference.

FIELD OF THE INVENTION

The present invention relates to the field of inspecting moving objects, and in particular to that of machines for automatically sorting and inspecting objects moving in a flow on a conveyor, of the conveyor belt type, for example. Typically, this type of machine is used for sorting household waste, and the conveyors used in this context generally have widths of 1 to 3 m, and the moving objects have heights of up to approximately 300 mm.

The subject matter of the present invention is an inspection device that advantageously, but not exclusively, can be implemented in the aforementioned field, as well as a machine comprising at least one such device and a method implementing said device, in particular for detecting the presence and/or the dimensional or geometric features of objects that cannot be recognized by the usual inspection techniques using reflected or through radiation.

PRIOR ART

Indeed, in the fields of sorting and inspecting involving the application of radiation, some objects cannot be recognized by the detector since they do not have any spectral shape or feature that would allow them to be distinguished on the conveyor belt on which they are placed. In the near-infrared spectral domain (~1,000 nm to 2,500 nm) this is the case, for example, for black objects containing carbon black, metals or inert materials (glass, earth or stone, for example). In the wavelength range of the visible domain (ranging between 400 and 800 nm), the objects that are not recognizable by the color vision systems are those not exhibiting contrast or exhibiting very low contrast with the background surrounding them. On a black conveyor belt, for example, black or transparent and colorless objects are difficult to detect, or are even impossible to detect.

However, for price, robustness and reliability reasons most conveyors of sorting machines are black. More specifically, they are black when in new condition, and become dark grey or brown after use and due to dirt, since in general they are not cleaned.

Therefore, detecting, and if appropriate characterizing, these moving objects has been proposed by mapping all the material points located above the support plane of the conveyor, preferably involving determining their heights relative to this plane, in other words, a map of all the points of all the objects above the plane of the conveyor.

Currently, several different solutions are industrially used to this end, namely:
time-of-flight measurement;
stereovision cameras;
laser profilometer.

The first solution involves emitting radiation or ultrasound from a source located at height, and measuring the return time of the wave to the emitter after it has rebounded from the measured object. Its precision is directly related to the ability to focus the emitted wave on a precise point, and to the measurement precision of the return time. The focusing constraint orients the solution toward the use of a laser light and a scanner, and the use of light requires electronics capable of measuring picoseconds in order to obtain resolutions of the order of one millimeter. This solution therefore requires very specific, very expensive and delicate electronics.

The other two aforementioned known methods are purely geometric.

In stereovision, the parallax is used between two cameras substantially facing in the same direction, and spaced apart by 20 to 30 cm. In a manner that is highly comparable to human vision, the lateral offset of the same point seen by the two cameras is directly linked to the distance of this point relative to each of the two cameras. This solution requires two cameras, and generally controlled lighting. In order to establish the correspondence between the positions of the characteristic points of the object in the two images, the object analysis carried out by the image processing software, but it is often invaluable, or even necessary, to add structured lighting, such as a laser, in order to be able to unambiguously recognize and locate the correspondence points between the two images.

With a laser profilometer, a parallax is also used, this time between the lighting direction and the detection direction. A single camera is necessary and this solution is therefore substantially simpler than stereovision.

Nevertheless, a common risk of these two geometric solutions is related to the effects of shading and masking: for good detection, the considered object point must be in direct view (line of sight free of obstacles) of the lighting source and of the one or more relevant camera(s). Evidently, this condition is better met with two lines of sight (laser profilometer) than with three (stereovision cameras).

As a result, the laser profilometer is preferred and is often retained in the field of inspection and sorting. It is also understood that a compromise exists between the risks of masking and the precision of measuring the height, since both increase with the parallax, By way of examples, documents WO 2012/089185 and WO 2019/043231 disclose the use of laser profilometers for measuring a profile of heights of objects moving on a mat. These documents use the principle that with sufficiently intense lighting, even a black or transparent object returns a significant and detectable signal. (By contrast, a clear opaque object returns a very strong signal, saturating the sensor). Due to its typical beam diameter of approximately 1 mm, a collimated laser naturally provides such lighting.

Document WO 2012/089185 in particular uses the diffusion of the laser light into the material and its resurgence after having passed under the surface of the material, with the production of an illuminated strip image of variable width and with fuzzy limits, allowing only rough processing that detects an expansion of the illuminated strip linked to this optical path. It should be noted that this operation requires the use of collimated lighting (therefore of a laser) in order to obtain an illuminating strip with a constant width irrespective of the height of the illuminated surface.

A known disadvantage of using a laser is the need to provide protective measures and optical precautions in order to avoid the risks of dazzling and of damaging the eyes of operators moving in the vicinity of the machine. The machine therefore needs to be carefully covered in order to prevent any direct rebounding of the laser beam toward the outside of the machine. However, when sorting heteroclite and various types of objects, such as household waste, whether this is packaging or is of industrial origin, numerous metal surfaces are present: cans, metallized films, exposed outer or inner metal coatings, various metal parts. These metal surfaces act as almost perfect mirrors, especially excluding painted surfaces.

However, the flow path of the moving objects must maintain a minimum height, typically of 30 cm without any obstacle, in order to avoid any risk of jamming. These two combined constraints make it almost impossible to guarantee that the laser beam does not rebound toward an outside point.

This problem is very similar to that encountered in X-ray machines, where the solutions retained to contain radiation use tunnels that are several meters long in order to circulate the objects, and even baffles at the machine inlet: these solutions are evidently not applicable in the stated context.

One solution that is sometimes proposed for this problem involves using an infrared (IR) laser, which is considered safe for the human eye, since it is outside its zone of sensitivity. However, the danger of burning still remains, and it is even more harmful, since the IR laser is not visible, personnel do not exercise caution and will not tend to adopt protective measures.

OBJECTS AND SUMMARY

The aim of the present invention is to propose a solution for addressing the disadvantages of the known inspection solutions based on laser profilometers, while providing similar performance capabilities in terms of detecting and inspecting moving objects, in particular for black and dark objects.

To this end, the first aim of the invention is a device for inspecting objects moving in a substantially monolayer flow on a flat support surface moving in a longitudinal direction, said device comprising, on the one hand, at least one lighting means providing a lighting beam with a median plane or axis, directed toward the support surface and for which the intersection with this support surface is made up of an illuminated strip, which extends transverse to the direction of movement and over all or part of the width of said support surface, on the other hand, at least one detection means having an optical axis or plane and an acquisition field, the dimension of which, in the direction transverse to the direction of movement, is at most equal to that of the illuminated strip, and also encompassing, in the direction of movement, non-illuminated zones of the support surface located upstream and downstream of said illuminated strip and a volume extending at least above said illuminated strip or strip portion, and optionally above the non-illuminated zones, and, finally, means for processing and evaluating the signals or data provided by said at least one detection means with a view to detecting the presence of the moving objects, of mapping their height and/or of determining their external volume, with these objects preferably being dark or black, with the median plane or axis of the one or more lighting beam(s) and the optical axis or plane of the detection means having a non-zero angle between them, called parallax angle, and the image of the illuminated strip acquired by said at least one detection means has a width that is equal to at least three times, preferably at least ten times, the resolution of said means, said device being characterized in that said at least one lighting means is configured and arranged such that the illuminated strip (6) generated on the support surface has a width in the direction of movement that is greater than 10 mm, advantageously ranging between 10 mm and 30 mm, is delimited, in the absence of an object, by two opposing straight parallel edges, which form clear limits in the image of this illuminated strip, and has sufficient contrast relative to the non-illuminated zones in order to be perceptible by the detection means and the processing and evaluation means, irrespective of the color of the moving object on which the illuminated strip is applied, and in that the one or each lighting beam is made up of a beam originating from an incoherent light source.

BRIEF DESCRIPTION OF THE DRAWINGS

The invention also relates to an inspection and sorting machine comprising at least one such device and a method for inspecting objects moving in a flow on a support surface.

The invention will be better understood by virtue of the following description, which relates to preferred embodiments, which are provided by way of non-limiting examples and are explained with reference to the appended schematic drawings, in which:

FIG. 2 is a perspective view of the device shown in FIG. 1a;

DETAILED DESCRIPTION

Figure 1A:
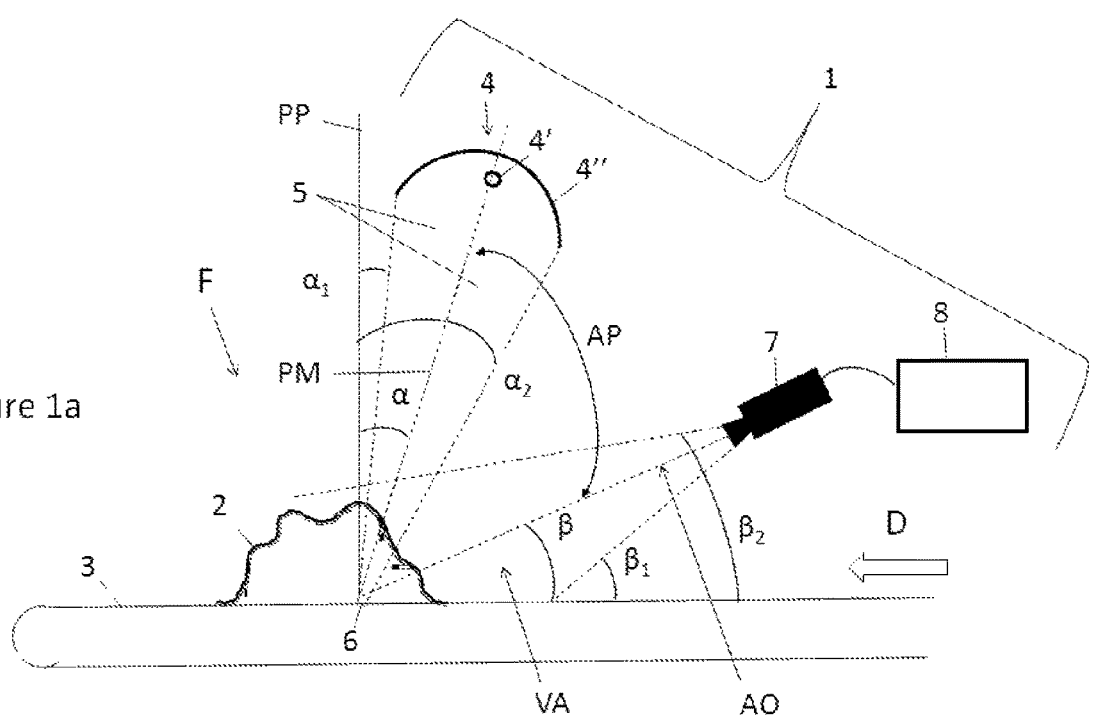
FIG. 1a is a side view of a preferred embodiment of the inspection device according to the invention, in which the detection means (camera) is located upstream of the lighting and in the low position.

FIGS. 1 to 4 schematically illustrate various embodiments of a device for inspecting objects (2) moving in a substantially monolayer flow (F) on a flat support surface (3) moving in a longitudinal direction (D).

This device (1) basically comprises:
on the one hand, at least one lighting means (4) providing a lighting beam (5) with a median plane or axis (PM), directed toward the support surface (3) and for which the intersection with this support surface (3) is made up of an illuminated strip (6), which extends transverse to the direction of movement (D) and over all or part of the width of said support surface (3), on the other hand, at least one detection means (7) having an optical axis or plane (AO) and an acquisition field (7'), the dimension of which, in the direction transverse to the direction of movement (D), is at most equal to that of the illuminated strip (6), and also encompassing, in the direction of movement (D), non-illuminated zones (6') of the support surface (3) located upstream and downstream of said illuminated strip or portion (6) and a volume (VA) extending at least above said illuminated strip (6), and optionally above the non-illuminated zones (6'), and, finally, means (8) for processing and evaluating the signals or data provided by said at least one detection means (7) with a view to detecting the presence of the moving objects (2), of mapping their height and/or of determining their external volume.

The axis or the median plane (PM) of the one or more lighting beam(s) (5) and the optical axis or plane (AO) of the one or more detection mean(s) (7) have a non-zero angle (AP) between them, called parallax angle. In addition, the image of the illuminated strip (6) acquired by said at least one detection means (7) has a width that is at least equal to three times the resolution of said means (7), and preferably at least ten times this resolution.

The term "n times the resolution" is understood herein to mean a width value equivalent to n times the dimension of the component or the elementary detection unit. Thus, for a matrix detection means, such as, for example, a camera or a similar image capture means, the width of the image of the strip (6) will be at least three pixels (strip formed by at least three rows of pixels).

In any case, in practice, the width of the illuminated strip (6) on the support surface (3), i.e., the distance separating the two adjacent edges (9, 9'), should be sufficient to be able to easily differentiate and clearly distinguish these two edges in order to advantageously be able to use the information separately provided by each of them. The inventors have been able to determine, by means of various tests, that the width of the illuminated strip (6) formed on the moving support surface (3) must be, in the direction of movement (D), greater than 10 mm, advantageously ranging between 10 mm and 30 mm, preferably of the order of approximately 20 mm. A greater width for its part would require an inflated illumination power in order to have sufficient contrast.

Thus, according to the invention, said at least one lighting means (4) is configured and arranged such that the illuminated strip (6) generated on the support surface (3) has a width in the direction of movement (D) that is greater than 10 mm, advantageously ranging between 10 mm and 30 mm, is delimited, in the absence of an object (2), by two opposing straight parallel edges (9, 9'), which form clear limits in the image of this illuminated strip (6), and has sufficient contrast relative to the non-illuminated zones (6') in order to be perceptible by the detection means (7) and the processing and evaluation means (8), irrespective of the color of the moving object (2) on which the illuminated strip (6) is applied. In addition, the one or each lighting beam (5) is made up of a beam originating from an incoherent light source (4'). By virtue of the provisions of the invention, it is therefore possible to overcome the disadvantages and risks associated with implementing laser profilometers, while providing similar performance capabilities in terms of detecting and mapping moving objects (2), also in particular for black, dark and transparent objects.

The notion of a dark or black object can be characterized by luminosity that is below a reflectance threshold expressed as a percentage of the reflectance of a white reference object (for example, a white ceramic or a white sheet of office paper). The typical values are between 2% and 10% reflectance, for an object that is perceived as black by the human eye.

As indicated above, the lateral delimitation of the illuminated strip (6) and its luminosity are advantageously such that the zone that it defines has two clear linear limits (9, 9'), beyond which the light intensity suddenly drops, for example, by at least 50%, advantageously from 60% to 80% at least. This contrast by a factor of 2 to 5 is sufficient to allow a clear distinction between an illuminated object (2), even dark or black, and a non-illuminated portion of a support surface (conveyor) (generally black, brown or dark grey).

When moving upwardly away from said conveyor (at a distance from the support surface), and therefore from the focal point (transverse focusing line), the illuminated zone widens: however, its limits remain clear and clearly identifiable in the image of the illuminated strip (6). The device (1) therefore remains efficient up to a height of approximately 10 cm, which is generally more than sufficient for presence detection, and even for a height measurement, since 99% of the objects (2) circulating on the conveyor are less than 10 cm high in the context of the preferred application of the invention (treatment of household and industrial waste).

A person skilled in the art can equally consider that it is a type of structured lighting with two detection lines (9 and 9'), instead of one line in the case of a laser: with the two "lines" being formed by the linear boundaries or edges between the highly illuminated zone (illuminated strip) and the outside (in particular the strips that are immediately laterally adjacent and are not illuminated). The information that is provided is therefore more substantial (twice the gathered information) than that resulting from the use of a reflected laser beam.

A person skilled in the art also understands that, depending on the width of the moving support surface (3) and the dimensional/performance capability features of the means 4 and 7, the device (1) can comprise one or more lighting mean(s) (4) and/or one or more detection means (7), respectively arranged side-by-side, in order to be able to perceive the whole of this width for the purpose of inspecting objects (2), In any case, the acquisition field of the one or each acquisition means (7) is fully included in the scope of the illuminated strip (6) in the direction (D), as indicated above.

Advantageously, the parallax angle (AP) is greater than 10°, and preferably ranges between 10° and 50°, the lighting means (4) and the detection means (7) may or may not be located on the same side of a plane (PP) perpendicular to the support surface (3) and parallel to the illuminated strip (6) (see FIGS. 1 to 4).

Of course, the detection means (7) can be made up of several, or even many components, the signals of which are consolidated before they are used by the means (8).

However, advantageously, the device (1) comprises a single detection means (7).

Figure 7:
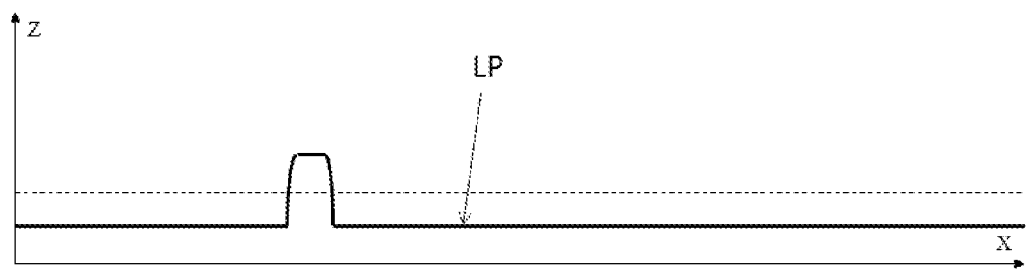
FIG. 7 shows the height profile deduced from the information of FIGS. 6.
Figure 8A:
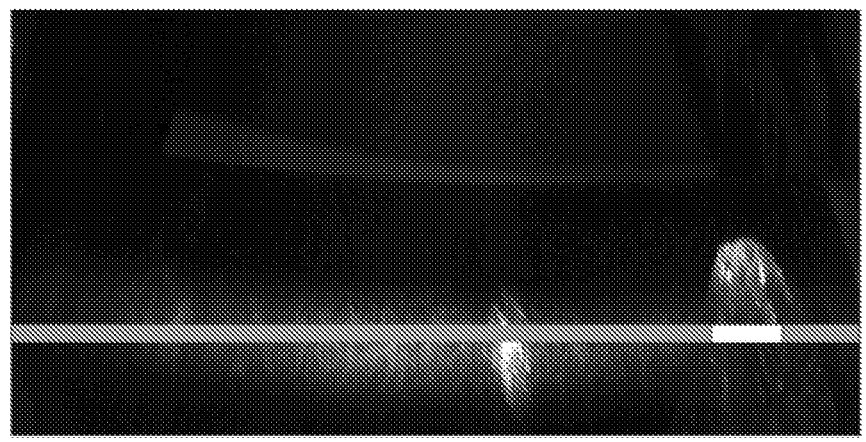
FIG. 8a, FIG. 8b, FIG. 8c, FIG. 8d FIG. 8e and FIG. 8f show pairs [instantaneous images of the illuminated strip/accumulated height profiles] when an entire object circulates through the device according to the invention.
Figure 8A:
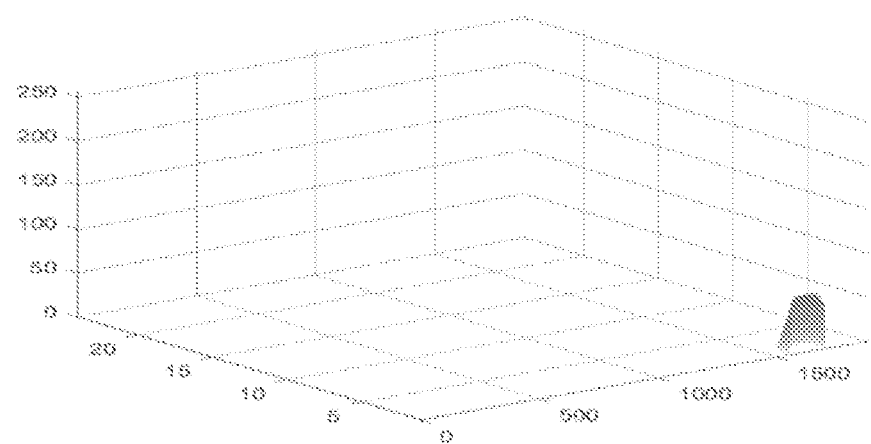
Figure 8B:
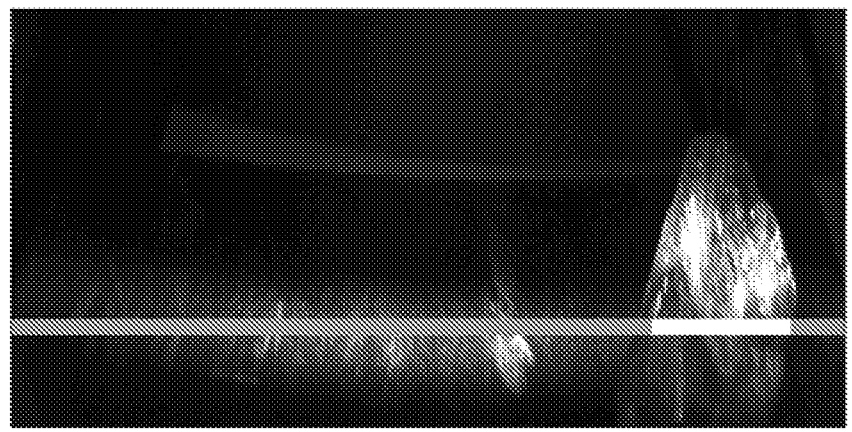
Figure 8B:
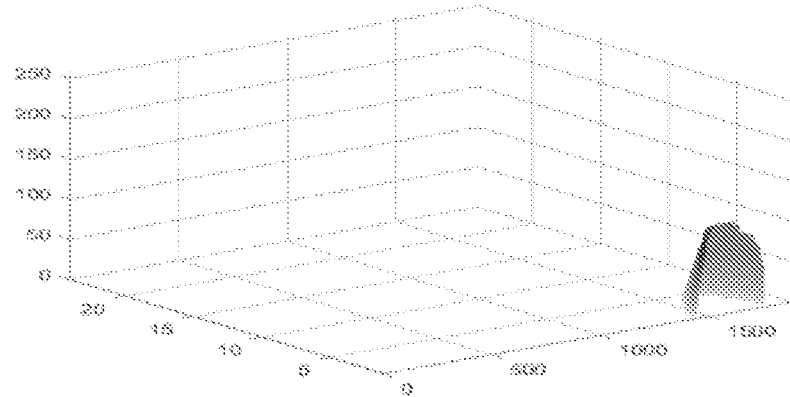
Figure 8C:
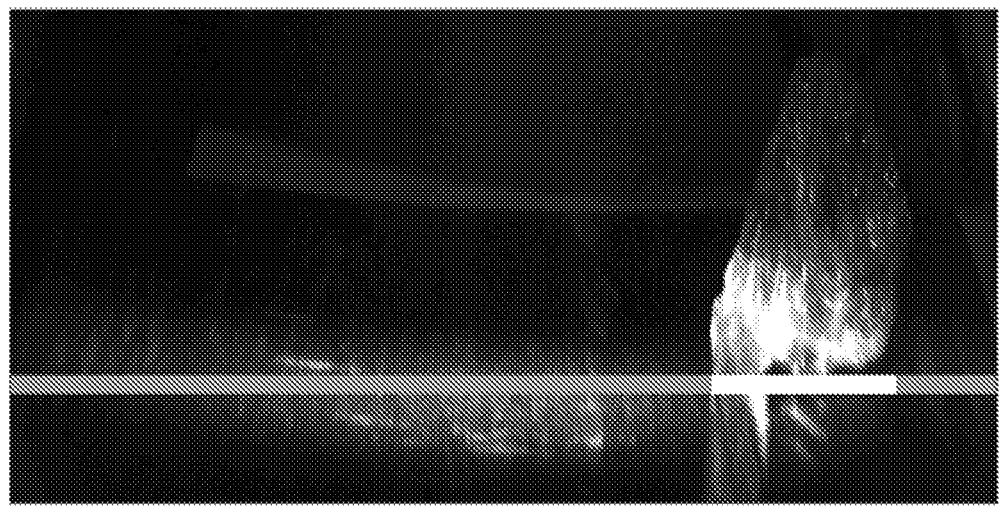
Figure 8C:
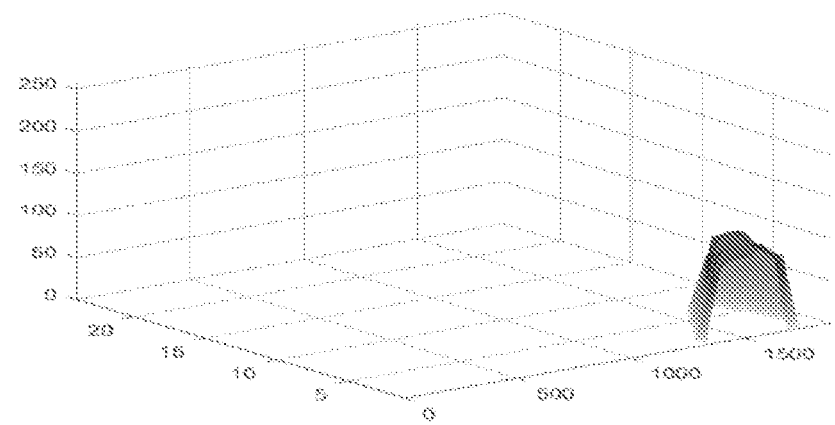
Figure 8D:
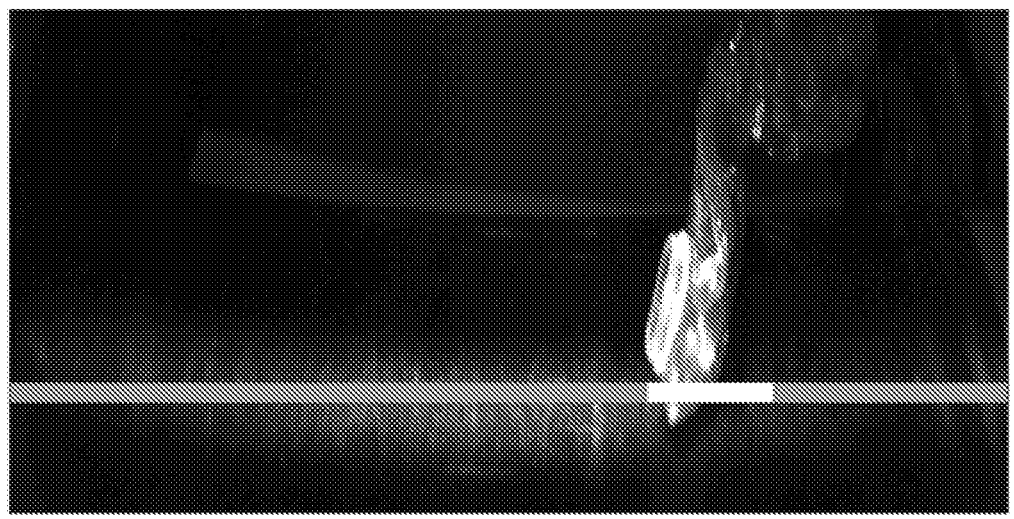
Figure 8D:
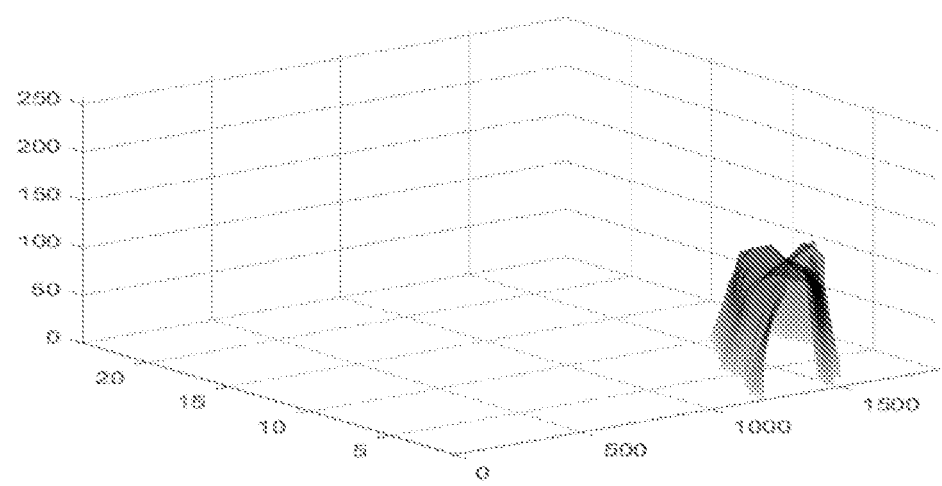
Figure 8E:
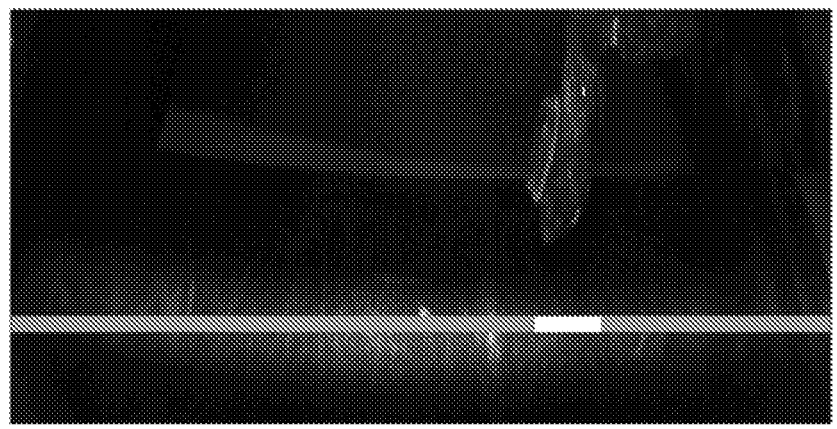
Figure 8E:
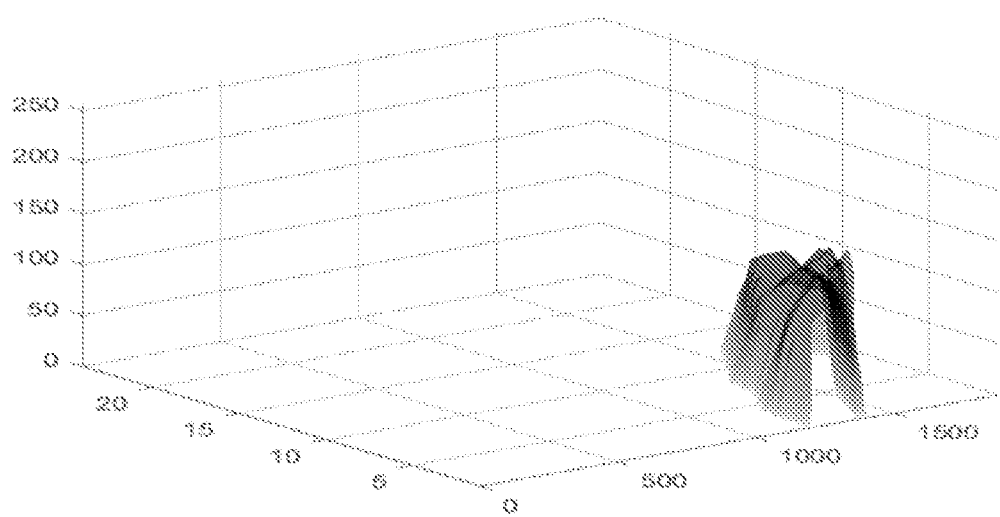
Figure 8F:
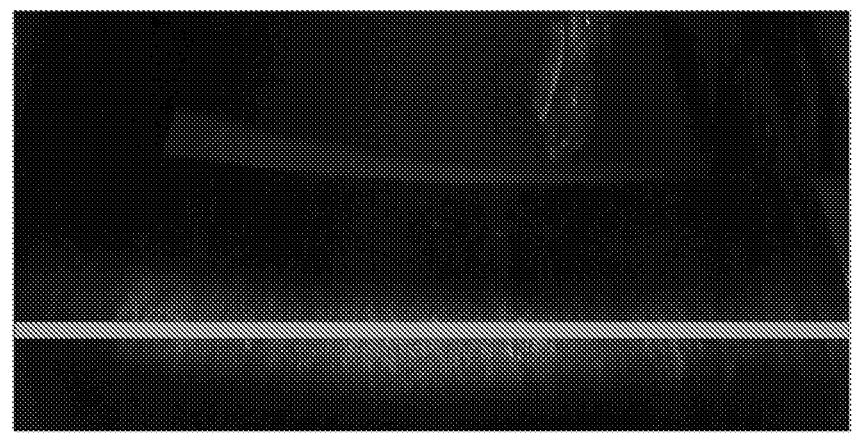
Figure 8F:
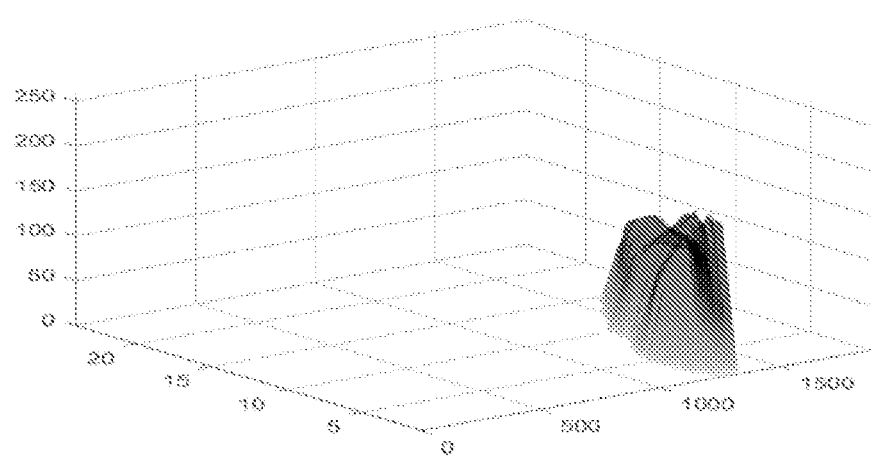

The one or each detection means (7) is preferably made up of a matrix camera, with the representation of the illuminated strip (6) used on the detection means (7) and/or the processing and evaluation means (8) advantageously being made up of a line (LP), preferably extending, in the absence of an object (2) impacted by the illuminated strip (6), in the lower part of the image provided by the detection means (7) and analyzed by the processing and evaluation means (8), as shown in FIG. 7, for example.

Preferably, the one or each lighting means (4) comprises at least one incoherent light source (4'), with an elongated constitution and arranged transverse to the direction of movement (D), and even a plurality of transversely aligned sources of this type. It also comprises at least one element (4") focusing the radiation emitted by the light source (4') in order to generate the illuminated strip (6) on the support surface (3).

Figure 1B:
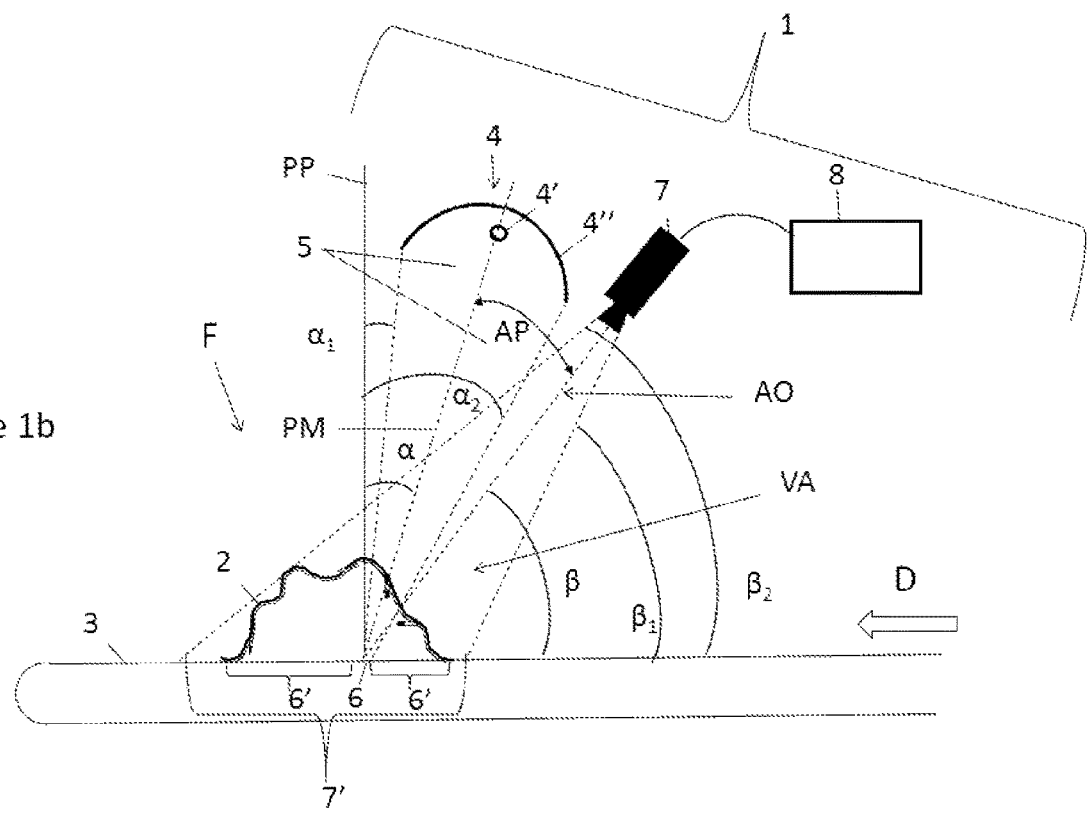
FIG. 1b is a side view similar to that of FIG. 1a, but with the detection means (camera) located upstream of the lighting means and in the high position, while remaining below the lighting.
Figure 2:
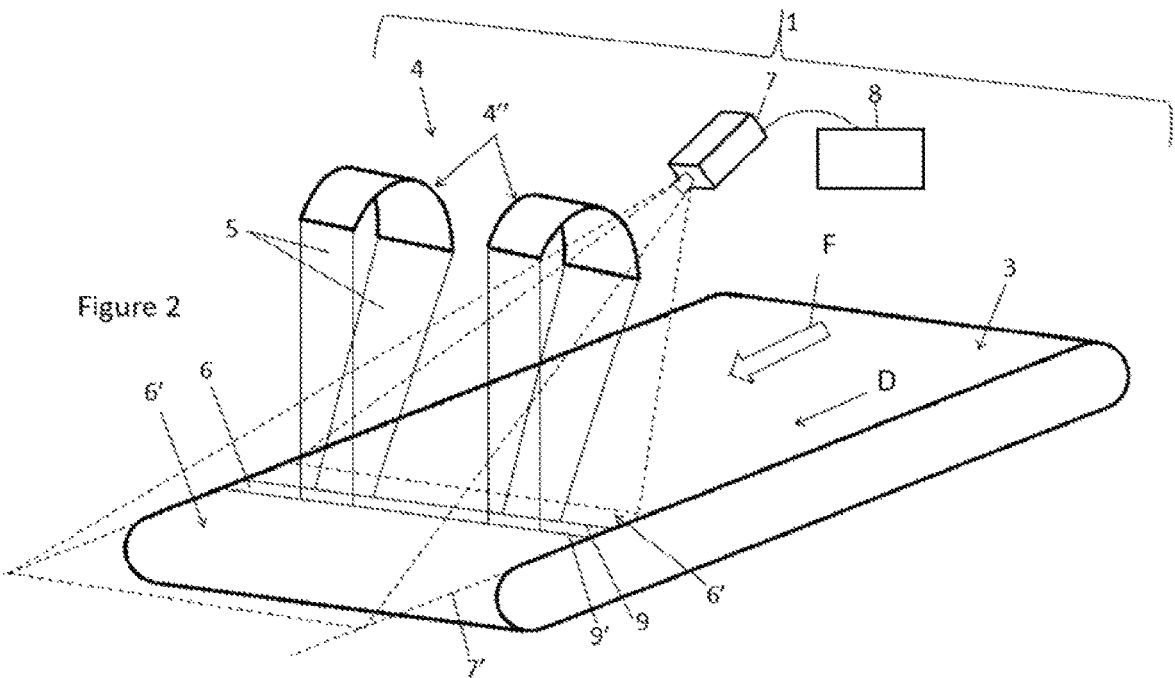
Figure 3:
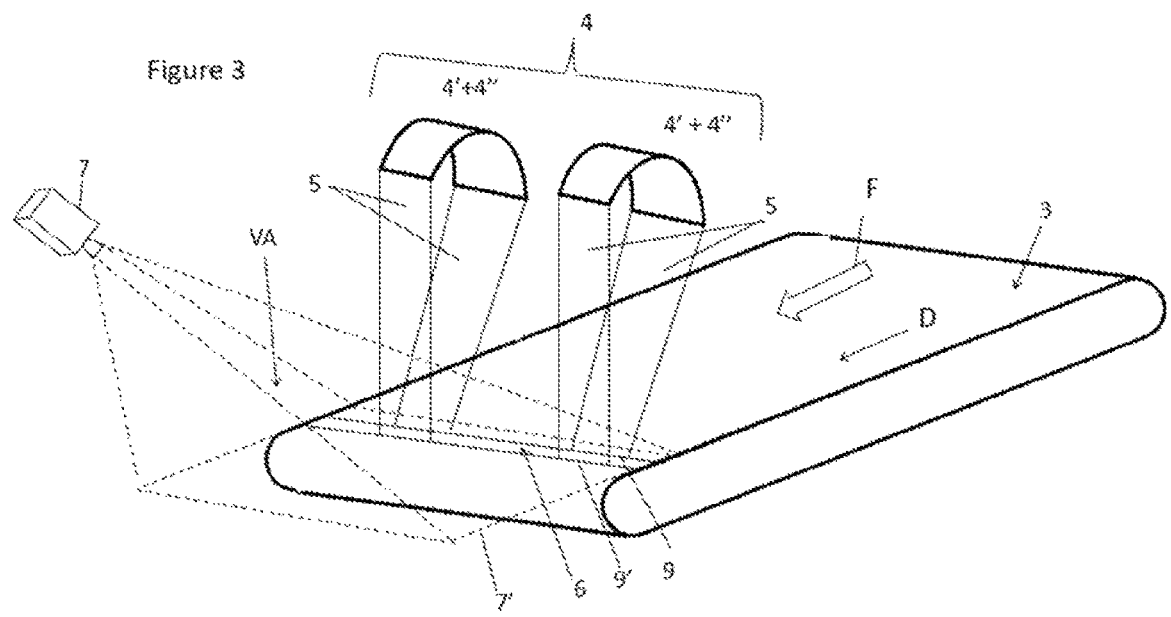
FIG. 3 is a perspective view of another preferred embodiment of the device according to the invention, with the detection means (camera) located downstream of the lighting means and facing it (on the opposite side of a plane vertical and transverse to the support surface)

In accordance with a first constructive variant, shown in FIGS. 1 to 3, the one or each lighting means (4) provides permanent lighting on the strip (6) and comprises at least one light source (4') in the form of a straight filament (for example, a halogen lamp) extending transverse to the direction of movement (D) and a focusing element (4") in the form of a reflector with a partially cylindrical-elliptical section, with the filament (4') being disposed at one of the focal points of the virtual ellipse of the reflector (4") and the other focal point being located in the vicinity of the support surface (3).

Figure 4:
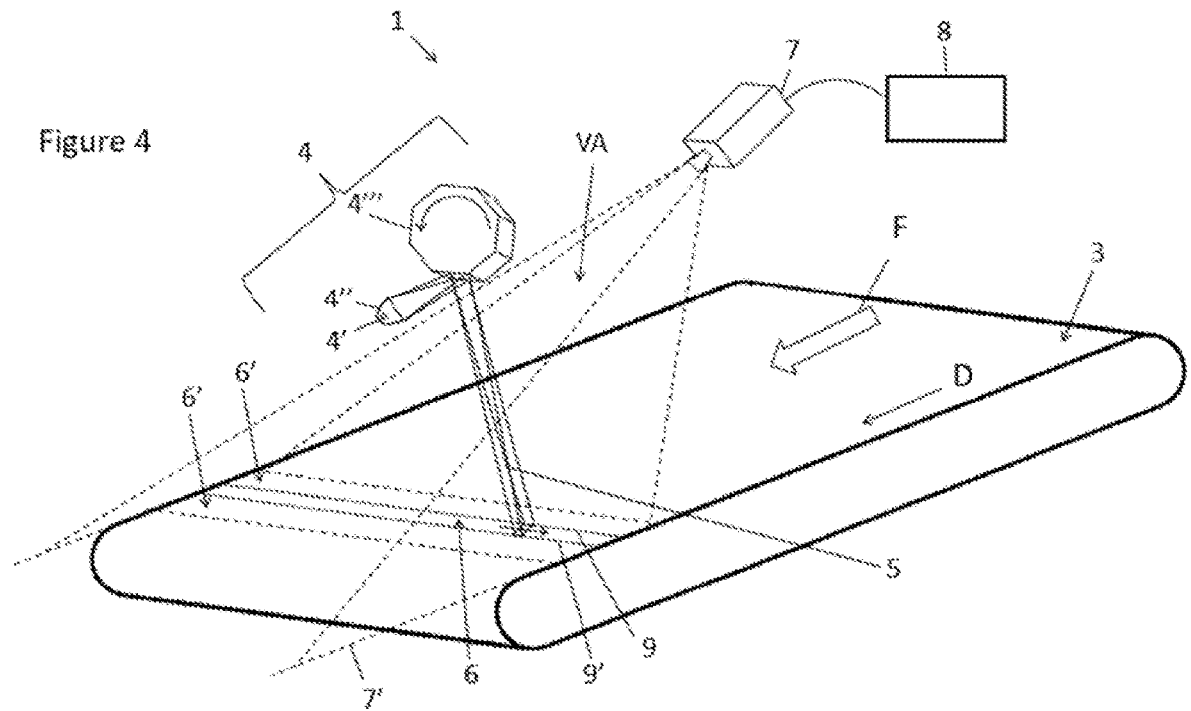
FIG. 4 is a perspective view of another preferred embodiment of the device according to the invention, with the use of a movable lighting means.

According to a second constructive variant, shown in FIG. 4, the one or each lighting means (4) provides lighting scanning over the illuminated strip (6) and comprises a fixed light source (4'), in the form of a filament, for example, associated with a focusing element (4"), in the form of a reflector with a partially elliptical section, for example, said lighting means (4) further comprising a movable transmission element (4'''), for example, applying the lighting originating from the source (4') and focused on the support surface (3) so as to generate the illuminated strip (6) by transverse scanning.

Generating an illuminated strip (6) exhibiting sufficient geometric and luminosity features for the reliable operation of the device (1) requires, within the context of constructing and mounting components of the one or each lighting means (4), taking into account particular points and criteria, in particular in relation to focusing the incoherent and multi-directional radiation originating from the source (4') and for the purpose of obtaining rectilinear and straight edges (9, 9') on the strip. The latter or rather the image of the latter theoretically can be limited widthwise to a minimum dimension equivalent to three rows of pixels in the image acquired by the camera (7), but in practice has a width of at least 10 rows of pixels, and physically has a width of one or more tens of millimeters, preferably of at least 20 mm.

Thus, with respect to the problem of focusing blur, it should be noted that the illuminated strip (6), in the dimension thereof parallel to the direction (D) of travel of the conveyor, is the magnified image of the filament of the source lamp (4') located on the first focal point of the virtual ellipse of the associated cylindrical-elliptical reflector (4"). If this filament is off-centered relative to the focal point, the image becomes blurred.

In addition, for this type of lamp, the filament seen in the dimension transverse to the conveyor assumes the shape of a daisy chain supported by supports (5 to 7 per filament). This shape curves and moves away from the focal point, especially when it is heated and therefore expanded. The images created by the various portions of the filament therefore blur substantially.

Finally, it also should be noted that the two lateral edges of the one or each reflector (4) are flat sheets. They are positioned perpendicular to the illuminated strip (6) and return the rays received from the filament (4') to this strip. A person skilled in the art understands that particular care therefore needs to be given to the design thereof (rigid part), and to the perfectly perpendicular attachment thereof.

By virtue of the structure of the elliptical or cylindrical-elliptical reflectors (4), the lighting beam (5) emitted by the means (4) is made up of two distinct cumulative parts providing two mutually overlapping illumination zones on the support surface (3), namely:

an illumination zone focused in the direction of travel or movement (D) of the objects (2), exhibiting high density: it is provided by the rays passing through a cylindrical-elliptical reflector (4"), and corresponds to the magnified image of the filament of the halogen tube that is used. In the direction transverse to the belt or conveyor corresponding to the movable flat support surface (3), the beam spreads over the entire width;

a direct illumination zone around the preceding zone, linked to the rays reaching the direct line of the filament of the halogen lamp (4') that is used. The maximum density of this part is less than 1% of the density of the previous one. With appropriate sensitivity adjustment of the camera (7), this lighting component can be overlooked relative to the preceding focused part.

Lighting means (4) that can be used within the scope of the present invention have already been mentioned in documents EP 1243350 and EP 3423202 in relation to a use of the spectral composition of the reflected radiation in order to sort material (near infrared spectroscopy). The inspection device (1) according to the invention therefore can be integrated at a lower cost into the type of machines described in these documents and already marketed by the applicant, since the lighting means (4) can be common to the two distinct detection means that are implemented, and the gathered signals advantageously can be used by the same processing and evaluation means (8).

A further aim of the present invention is a method for inspecting objects (2) moving in a substantially monolayer flow (F) on a flat support surface (3) moving in a longitudinal direction (D).

This method is carried out by implementing a device (1) comprising, on the one hand, at least one lighting means (4) providing a lighting beam (5) with a median plane or axis (PM), directed toward the support surface (3) and for which the intersection with this support surface (3) is made up of an illuminated strip (6), which extends transverse to the direction of movement (D) and substantially over the entire width of said support surface (3), on the other hand, at least one detection means (7) having an optical axis or plane (AO) and an acquisition field (7') encompassing at least the illuminated strip (6), non-illuminated zones (6') of the support surface (3) located on either side along said illuminated strip (6) and a volume (VA) extending at least above said illuminated strip (6), and optionally above the non-illuminated zones (6'), and, finally, means (8) for processing and evaluating the signals or data provided by said at least one detection means (7) with a view to detecting the presence of the moving objects (2), of mapping their height and/or of determining their external volume.

This device (1) is configured such that the median plane or axis (PM) of the lighting beam (5) and the optical axis or plane (AO) have a non-zero angle (AP) between them, called parallax angle, and said method involves providing, on the one hand, an image of the illuminated strip (6) acquired by said at least one detection means (7) that has a width that is at least equal to three times the resolution of said means (7), and, on the other hand, an illuminated strip (6) on the support surface (3) that is delimited by two opposing straight parallel edges (9, 9') that can be mutually differentiated in the image, that has a width in the direction of movement (D) that is greater than 10 mm, advantageously ranging between 10 mm and 30 mm, and that has sufficient contrast relative to the non-illuminated zones (6') in order to be perceptible by the detection means (7) and usable by the processing and evaluation means (8), irrespective of the color of the moving object (2) on which the illuminated strip (6) is applied, with the or each lighting beam (5) being made up of a beam originating from an incoherent light source (4').

According to one feature of the invention, provision can be made to extract, from the image of the illuminated strip (6), by means of at least one suitable data processing program executed by the processing and evaluation means (8), at least one profile line (LP) representing the altitude relative to the moving support surface (3), and comparing this profile line with a minimum threshold value for the presence of an object, and, if appropriate, using this profile line in order to determine the height of the inspected objects (2) point-by-point.

According to another feature, provision also can be made to analyze the luminance of the successive profile lines (LP) of an object (2) and to use it in order to classify said object (2) as a dark object or a clear object.

Finally, provision also can be made to accumulate successive profile lines of the same object (2) over time in order to reconstitute the apparent shape and/or to compute the volume thereof.

Advantageously, the profile detection program applied by the processing and evaluation means (8) can implement a search for the luminance percentile detected along each line perpendicular to the image of the illuminated strip (6), followed by an operation for thresholding the profile line.

In relation to an alternative embodiment, the processing and evaluation means (8) can implement two profile detection operations for finding and using two limits, namely the high and low intersections of the illuminated strip (6) with the object (2) that is present, in other words, the two edges (9 and 9') of the image of said illuminated strip (6).

The method thus can involve determining a first profile following a high limit (LH) defined by a first angle ($\alpha$), for example, a first edge of the illuminated strip in the direction of movement, and a second profile following a low limit (LB) defined by a second angle ($\alpha$2), for example, a second edge of the illuminated strip in the direction of movement, with these two limits (LH, LB) corresponding to the two aforementioned edges (9, 9') of the illuminated strip (6) projected onto the object (2), and being offset in time with the movement of the inspected object (2).

Preferably, the two aforementioned operations are distinct and implemented separately, with the two profiles being determined independently of one another.

Also preferably, the aforementioned method implements an inspection device (1) as described above.

Finally, the invention also relates to a machine for automatically inspecting and sorting objects (2) moving in a substantially monolayer flow (F) on a conveyor, of the conveyor belt type, for example, providing a moving support surface (3) for said objects (2), with this machine being characterized in that it comprises, mounted above the conveyor, at least one inspection device (1) as described above.

Optionally, several (at least two) devices (1) can be provided that comprise either a common lighting means (4) and at least two distinct detection means (7), or a common detection means (7) and at least two distinct lighting means (4) or even corresponding to at least two distinct modules each comprising a lighting means (4) and a detection means (7), arranged side-by-side transverse to the direction of movement (D).

A more detailed description of various alternative embodiments of the invention is provided hereafter with reference to the appended figures.

Firstly, with reference to FIG. 1a, a lighting means (4) is shown with a source (4'), namely a lighting fitting (4) with a focused reflector (4") and a halogen tube (4'), called "halogen reflector" hereafter, which concentrates the light energy on a narrow illuminated strip (6) of the surface of the conveyor (3) that conveys the objects (2) to be inspected. The rays arrive at an average angle a relative to the vertical to the moving flat conveying support surface (3), with the beam (5) being delimited by the extreme angles $\alpha$1 and $\alpha$2. A matrix camera (7) in this case is placed upstream of the illuminated zone in the form of a strip (6) and is directed toward the conveyor, with an average angle $\beta$ (of its optical axis AO) relative to the horizontal (flat surface of the conveyor). The low and high ends of its field of view or acquisition volume (VA) correspond to the angles $\beta$1 and $\beta$2.

Compared to a laser profilometer, the main difference lies in the fact that the lighting is not only concentrated in the direction $\alpha$, but that it fills the entire angular sector ranging from $\alpha$1 to $\alpha$2. The width of this illuminated strip (6) depends on the variable height (above the conveyor) of its application surface (surface of the conveyor or surface of an object), but its two limits (9 and 9') remain clear and detectable by the camera (7) in the aforementioned range of heights.

This illuminated strip (6) illuminated by focused illumination is functionally combined with a matrix camera (7) in order to form a triangulation system capable of detecting and mapping all the objects (2), even black, dark and spectrally inert objects, that are present on the conveyor and pass through said illuminated strip.

Such a device (1) has several advantages in terms of costs and integration: a single camera per device, no specific lighting and no covering cost (as there is no laser source).

Finally, and although it is not shown herein, the machine can comprise, in addition to the detection means (7) of the device (1), another detector placed in the direction detection plane a, between two reflectors (4"), in order to form a detection system coplanar with the lighting and inclined on the vertical, as described in the aforementioned document EP 1243350.

The mean parallax of the device (1) is provided by the difference between the two lines of sight, or in this case the angle $AP=\pi/2-\alpha-\beta$. The greater this angle, the more precise the height measurement, but the more the risks of masking are maximized depending on the shape of the apparent object (2).

Advantageously, the values selected for $\alpha$ range from 0 to 30°, and for $\beta$ from 30 to 75°.

FIG. 1a illustrates a value of $\beta$ close to 30° ("low upstream" position), and FIG. 1b illustrates a "high upstream" position with $\beta$ close to 75°.

Several other preferred embodiments of the device (1) use different geometric arrangements, without departing from the scope of the invention.

Thus, two possible positions can be contemplated for the camera, and are illustrated in FIGS. 2 and 3 as perspective views:

FIG. 2 illustrates a "low upstream" position: a configuration for which the angle between the axis of sight of the camera and the vertical is significant. This position is also that shown in FIG. 1a. In this case, it is possible to maintain a degree of freedom of movement of the camera in the horizontal direction and this variant exhibits good precision for the altitude measurement. However, it can also produce an object masking effect: an upstream object can mask an object on the illuminated strip (6).

FIG. 1*b* shows an example of a "high upstream" position: in this case the camera (7) is installed immediately below the lighting means (4), and as close as possible. The parallax is thus minimized, which has the advantage of reducing the effect of reduced masking compared to the aforementioned configuration, but reduces the reduced altitude precision compared to the aforementioned configuration.

FIGS. 1 and 2 show that the lighting means is made up of two halogen reflectors (4'+4") that are mutually spaced apart in the transverse direction. This possible configuration is not necessarily required, and the operation of the device (1) would be identical with a continuous row of contiguous reflectors (4'+4") covering the entire width of the conveyor (3). Indeed, with a sufficient parallax (angle AP), the field of view (VA) of the camera (7) is entirely located below the lower limit of the reflectors (4) and does not interfere with them.

FIG. 3 illustrates an example of a position called "downstream" position corresponding to a high configuration looking rearward (in the opposite direction to the direction of movement D of the flow F), with a possible degree of freedom of the camera (7) in the vertical direction. This constructive variant has a reduced masking effect between objects (2), by virtue of the objects starting to fall from the end of the conveyor, but experiences greater exposure to soiling due to the waste ejection system located directly below the end of the conveyor.

Finally, FIG. 4 illustrates a configuration using a movable lighting means (4) that has the same features as the fixed lighting means of FIGS. 1 to 3. Lighting of this type is described, for example, in document WO 2013/115650.

As shown in FIG. 4, the radiation from a source (4') comprising an incandescent lamp, for example, a halogen lamp, is focused by means of a convergent reflector (4"), or by means of a lens, and is projected onto a rotating mirror (4'''), which at all times sends the focused light onto an elementary rectangular zone, which scans an illuminated strip (6) on the moving flat support surface (3). This strip is naturally delimited by the limits of the mirror face that returns the lighting beam of the lamp (4'). For the correct operation of the device (1) of FIG. 4, having a maximum contrast at the edges (9 and 9') is desirable. This condition is met if the convergent beam (5) originating from the lamp 6 intersects the top and bottom edges of the mirror face. Two clear limits of the illuminated strip are thus obtained, as in the solutions described above, even if they are substantially further away than those of the strip obtained by the variants of FIGS. 1 to 3.

In the absence of an object (2), the illuminated strip (6) appears as a horizontal strip in the image of the camera (7). The field of view (VA) of the camera must be adjusted so that this strip is visible in the lower half of the image.

Furthermore, and in a manner known to a person skilled in the art, the exposure time and/or the diaphragm of the camera (7) are adjusted so as not to saturate on the lighting line and on non-glossy black objects. It is also possible to add a filter to the objective lens in order to adapt the light intensity range to the sensitivity dynamics of the camera.

Figure 5:
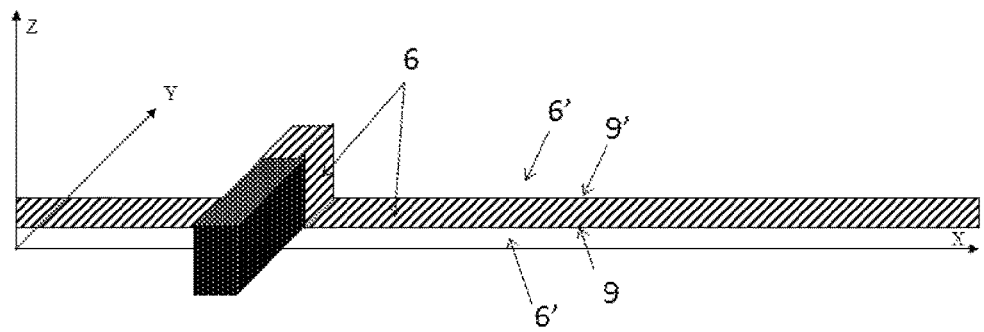
FIG. 5 is a perspective view showing the intersection of the illuminated strip with a rectangular object moving on the support plane.

When an object (2) passes through, the position of the depiction of the illuminated strip (6) in the image is modified as illustrated in FIG. 5 (the direction Y represents the direction of travel or movement D of the moving support surface of the conveyor 3).

Figure 6:
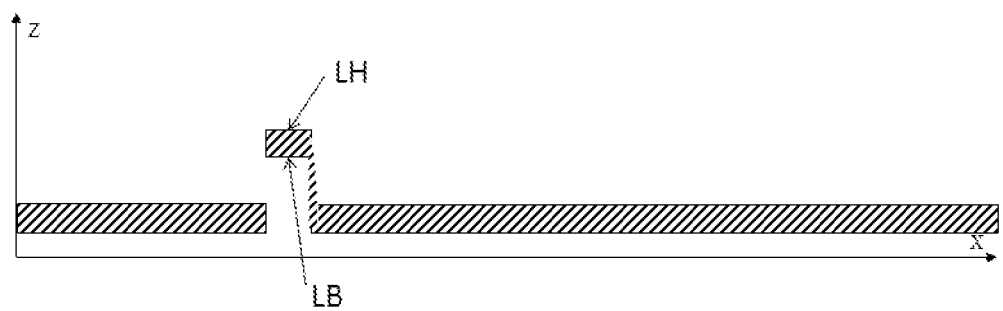
FIG. 6 is a view in the plane of the camera showing how the image of the illuminated strip is modified by the presence of the object of FIG. 5.

In the measured image, the useful gathered data is of the form indicated in FIG. 6.

A first profile detection program (for example, using an image segmentation technique) searches for the position of the maximum signal column-by-column. This maximum is normally located in the intersection zone of the illuminated strip (6) with the object (2).

In order to make this processing more reliable, and as stated above, this search for a maximum can be replaced by a column-by-column percentile search. Indeed, the maximum value has the risk of being disrupted by various phenomena (dead pixels on the sensor of the camera, bright spots in the image, etc.). Since the illuminated strip (6) is relatively wide (for example, compared to a laser beam) and measurable on at least several wide pixels in the image, the use of a high percentile allows this type of measurement bias to be overcome. The values targeted for this percentile are between 80 and 100% (with 100% corresponding to the maximum). The profile line thus computed by this first program corresponds to a vector containing as many elements as there are columns in the image. The values of this vector are expressed in pixel numbers, and simple geometric modeling shows that this number is substantially proportional to the altitude of the possible objects relative to the level of the support surface of the conveyor (3). A thresholding operation of this profile line is then carried out in order to isolate the objects (2) from the remainder of the support surface (3). Once processed, the profile signal (profile line LP) assumes the shape illustrated in FIG. 7.

In this diagram, the solid line represents the profile line measured on the image and the dashed line represents the position of the threshold from which an object (2) is considered to be detected.

A triangulation computation that is known to a person skilled in the art determines, from the angles of FIG. 1*a* and the distances between the camera (7), the lighting means (4) and the support surface of the conveyor (3), the height of the object (2) at this point. This height is substantially proportional to the vertical position of the strip, expressed in pixels, and counted from the position of this strip in the absence of an object (zero line).

The minimum detectable height theoretically corresponds to an offset of at least one pixel relative to the zero line, and a reliable minimum is obtained for two offset pixels. In the preferred embodiment, it is from 1 to 3 mm as a function of the resolution of the detection means (7)/camera used.

By means of the results of the operations carried out by the aforementioned computation programs implemented by the processing and evaluation means (8), all the objects (2) with altitude above a predefined threshold can be distinguished.

The first service provided by the device (1) is therefore the detection of the presence of any object (2) having a minimum height.

The implementation of a second profile detection program can be provided (advantageously in addition to the first program), which is intended to search for two limits, namely the high and low intersections of the illuminated strip with the object (2) that is present. This additional information can be used to provide a certain amount of redundancy, and therefore a more precise diagnosis of the shape of the inspected object (2). For example, in FIG. 1*a*, it is then possible to determine the profile equally by following the high limit LH defined by the angle α1, and by the movement of the low limit LB defined by the angle α2, with these two limits corresponding to the edges (9, 9') of the illuminated strip (6) projected onto the object (2). Two profiles that are offset over time with the movement of the inspected object (2) are thus obtained. Having two independently computed profiles increases the average precision. In addition, the entry and exit times of the object (2) in each limit are different. In this case, it is possible to more easily measure vertical portions of objects (edge of a cardboard box), or to avoid any effects of masking by an object located upstream of the object of interest.

As can be seen from FIG. 4, such a dual detection of the two low and high limits of the illuminated strip also can be carried out with identical angles α1 and α2.

It is also possible to contemplate distinguishing two distinct classes from among the inspected objects (2), as a function of the intensity (or luminance) of the pixels corresponding to the recorded profile line, namely: a dark class, which includes the pixels of the luminance profile line below a predefined threshold (see the above definition), and a clear class, which includes the pixels of the luminance profile line above this same threshold.

In practice, the pixels of the clear objects have a high value, while those of the dark objects have a low value. The distinction between clear objects and dark objects is therefore feasible by means of the 2 thresholding operations described above (the first for detecting an object acting on the altitude and the second for distinguishing between clear and dark objects acting on the intensity of the pixels). It should be noted that the dark objects that have bright spots potentially will be seen as clear objects with this type of processing.

The inventors completed operating tests for a prototype of the aforementioned device and machine and the results of these tests, which are shown by way of examples in FIGS. 8a to 8f, show that an almost complete height profile of a moving object (2), in this case a bottle, can be obtained.

These figures show the process of forming a temporal accumulation of measured profiles. The time axis is shown virtually from top to bottom in the figure (the images at the top of the figure correspond to shots taken prior to those below). The last image of each sequence recorded by the camera is shown on the left-hand part of this figure, The interpretation of the profile line is superimposed on these images:
the gray line corresponds to a profile line below the threshold for triggering the detection of an object;
the portions of this line shown in white correspond to the positions for which the object detection threshold is exceeded.

The right-hand part of each of FIGS. 8a to 8f illustrates the relief thus computed and accumulated over approximately twenty successive time measurements. The relief is expressed in pixels in this figure.

In the final profile that is obtained (FIG. 8f), the only missing surface elements are the points that are not simultaneously visible as a direct line by the detection means (7)/camera and the lighting means (4)/halogen lamp+reflector assembly; such as those that are overhanging (lower face of the bottle).

Providing a complete profile of the heights (the values of Z for all the positions X, Y of the object in the image) allows a map to be reconstituted of the external volume of the inspected object (2). It is thus possible to compute its volume.

This also allows the "valleys" between two contacting objects (2) to be identified in the profiles: a suitable program can then search for the local minimum height in order to help to divide a group of adjacent objects into individual objects (2).

Of course, the invention is not limited to the embodiments described and shown in the appended drawings. Modifications remain possible, in particular from the perspective of the formation of the various elements or by substituting technical equivalents, without necessarily departing from the scope of protection of the invention.

The invention claimed is:

1. A device for inspecting objects moving in a substantially monolayer flow on a flat support surface moving in a longitudinal direction, said device comprising:
at least one lighting means providing a lighting beam with a median plane or axis, directed toward the support surface and for which the intersection with this support surface is made up of an illuminated strip, which extends transverse to the direction of movement and over all or part of the width of said support surface,
at least one detection means having an optical axis or plane and an acquisition field, the dimension of which, in the direction transverse to the direction of movement, is at most equal to that of the illuminated strip, and also encompassing, in the direction of movement, non-illuminated zones of the support surface located upstream and downstream of said illuminated strip and a volume extending at least above said illuminated strip or strip portion, and optionally above the non-illuminated zones, and,
means for processing and evaluating the signals or data provided by said at least one detection means with a view to detecting the presence of the moving objects, of mapping their height and/or of determining their external volume, with the median plane or axis of the one or more lighting beam(s) and the optical axis or plane of the detection means having a non-zero angle between them, called parallax angle, and the image of the illuminated strip acquired by said at least one detection means has a width that is equal to at least three times the resolution of said detection means,
wherein said at least one lighting means is configured and arranged such that the illuminated strip generated on the support surface has a width in the direction of movement that is greater than 10 mm, is delimited, in the absence of an object, by two opposing straight parallel edges, which form clear limits in the image of this illuminated strip, and has sufficient contrast relative to the non-illuminated zones in order to be perceptible by the detection means and the processing and evaluation means, irrespective of the color of the moving object on which the illuminated strip is applied, and in that the one or each lighting beam is made up of a beam originating from an incoherent light source.

2. The device as claimed in claim 1, wherein the illuminated strip formed on the moving support surface has a width, in the direction of movement, of the order of approximately 20 mm.

3. The device as claimed in claim 1, wherein the parallax angle is greater than 10°, the lighting means and the detection means may or may not be located on the same side of a plane perpendicular to the support surface and parallel to the illuminated strip.

4. The device as claimed in claim 1, wherein the single or each detection means is a matrix camera, with the representation of the illuminated strip used on the detection means and/or the processing and evaluation means advantageously being made up of a row, extending, in the absence of an object impacted by the illuminated strip, in the lower part of the image provided by the detection means and analyzed by the processing and evaluation means.

5. The device as claimed in claim 1, wherein the one or each lighting means comprises at least one incoherent light source, with an elongated constitution and arranged transverse to the direction of movement, and at least one element focusing the radiation emitted by this or these light source(s) in order to generate the illuminated strip on the support surface.

6. The device as claimed in claim 1, wherein the one or each lighting means provides permanent lighting on the strip and comprises at least one light source in the form of a straight filament extending transverse to the direction of movement and a focusing element in the form of a reflector with a partially cylindrical-elliptical section, with the filament being disposed at one of the focal points of the virtual ellipse of the reflector and the other focal point being located in the vicinity of the support surface.

7. The device as claimed in claim 1, wherein the one or each lighting means provides lighting scanning over the illuminated strip and comprises a fixed light source, in the form of a filament, associated with a focusing element, in the form of a reflector with a partially elliptical section, said lighting means further comprising a movable transmission element, for example, applying the lighting originating from the source and focused on the support surface so as to generate the illuminated strip by transverse scanning.

8. A machine for automatically inspecting and sorting objects moving in a substantially monolayer flow on a conveyor, of the conveyor belt type, for example, providing a moving support surface for said objects,
    said machine comprising, mounted above the conveyor, at least one inspection device as claimed in claim 1, optionally a plurality of devices comprising either a common lighting means and at least two distinct detection means or a common detection means and at least two distinct lighting means or else corresponding to at least two distinct modules each comprising a lighting means and a detection means, arranged side-by-side transverse to the direction of movement.

9. A method for inspecting objects moving in a substantially monolayer flow on a flat support surface moving in a longitudinal direction of movement, by implementing a device comprising
    at least one lighting means providing a lighting beam with a median plane or axis, directed toward the support surface and for which the intersection with this support surface is made up of an illuminated strip, which extends transverse to the direction of movement and substantially over the entire width of said support surface,
    at least one detection means having an optical axis or plane and an acquisition zone or field encompassing at least the illuminated strip, non-illuminated zones of the support surface located on either side along said illuminated strip and a volume extending at least above said illuminated strip, and optionally above the non-illuminated zones, and
    means for processing and evaluating the signals or data provided by said at least one detection means with a view to detecting the presence of the moving objects, of mapping their height and/or of determining their external volume, said device being configured such that the median plane or axis of the lighting beam and the optical axis or plane have a non-zero angle between them, called parallax angle, and said method comprising:
    providing an image of the illuminated strip acquired by said at least one detection means that has a width that is at least equal to three times the resolution of said detection means, and,
    an illuminated strip on the support surface that is delimited by two opposing straight parallel edges that can be mutually differentiated in the image, that has a width in the direction of movement that is greater than 10 mm and that has sufficient contrast relative to the non-illuminated zones in order to be perceptible by the detection means and usable by the processing and evaluation means, irrespective of the color of the moving object on which the illuminated strip is applied, with the one or each lighting beam being made up of a beam originating from an incoherent light source.

10. The method as claimed in claim 9, wherein said method involves extracting, from the image of the illuminated strip, by means of at least one suitable data processing program executed by the processing and evaluation means, at least one profile line representing the altitude relative to the moving support surface, and comparing this profile line with a minimum threshold value for the presence of an object, and, optionally, using this profile line in order to determine the height of the inspected objects point-by-point.

11. The method as claimed in claim 10, wherein said method involves analyzing the luminance of the successive profile lines of an object and using it in order to classify said object as a dark object or a clear object.

12. The method as claimed in claim 10, characterized in that it wherein said method involves accumulating the successive profile lines of the same object over time in order to reconstitute the apparent shape and/or to compute the volume thereof.

13. The method as claimed in claim 9, wherein the profile detection program applied by the processing and evaluation means implements a search for the luminance percentile detected along each line perpendicular to the image of the illuminated strip, followed by an operation for thresholding the profile line.

14. The method as claimed in claim 9, wherein the processing and evaluation means implements two profile detection operations for finding and using two limits, namely the high and low intersections of the illuminated strip with the object that is present.

15. The method as claimed in claim 14, wherein said method involves determining a first profile following a high limit defined by a first angle and a second profile following a low limit defined by a second angle, with these two limits corresponding to the two edges of the illuminated strip projected onto the object, and being offset in time with the movement of the inspected object.

16. The method as claimed in claims 14, wherein the two operations are distinct and are implemented separately, with the two profiles being determined independently of each other.

17. The method as claimed in claim 9, wherein said method involves implementing at least one inspection device comprising:
    at least one lighting means providing a lighting beam with a median plane or axis. directed toward the support surface and for which the intersection with this support surface is made up of an illuminated strip, which extends transverse to the direction of movement and over all or part of the width of said support surface,
    at least one detection means having an optical axis or plane and an acquisition field, the dimension of which. in the direction transverse to the direction of movement. is at most equal to that of the illuminated strip, and also encompassing, in the direction of movement, non-illuminated zones of the support surface located upstream and downstream of said illuminated strip and a volume extending at least above said illuminated strip or strip portion, and optionally above the non-illuminated zones, and, means for processing and evaluating the signals or data provided by said at least one detection means with a view to detecting the presence of the moving objects, of mapping their height and/or of determining their external volume with the median plane or axis of the one or more lighting beam(s) and the optical axis or plane of the detection means having a non-zero angle between them, called parallax angle, and the image of the illuminated strip acquired by said at least one detection means has a width that is equal to at least three times the resolution of said detection means, wherein said at least one lighting means is configured and arranged such that the illuminated strip generated on the support surface has a width in the direction of movement that is greater than 10 mm, is delimited, in the absence of an object, by two opposing straight parallel edges, which form clear limits in the image of this illuminated strip, and has sufficient contrast relative to the non-illuminated zones in order to be perceptible by the detection means and the processing and evaluation means, irrespective of the color of the moving object on which the illuminated strip is applied, and in that the one or each lighting beam is made up of a beam originating from an incoherent light source.

18. The device as claimed in claim 1, wherein said moving objects are dark or black.

19. The device as claimed in claim 1, wherein the illuminated strip generated on the support surface has a width in the direction of movement that ranges between 10 mm and 30 mm.

20. The device as claimed in claim 3, wherein the parallax angle ranges between 10° and 50°.

* * * * *